(12) United States Patent
Chiu

(10) Patent No.: US 12,193,537 B2
(45) Date of Patent: Jan. 14, 2025

(54) WARNING SIGNAL DEVICE OF HELMET

(71) Applicant: Ju-Hui Chiu, Taoyuan (TW)

(72) Inventor: Ju-Hui Chiu, Taoyuan (TW)

( * ) Notice: Subject to any disclaimer, the term of this patent is extended or adjusted under 35 U.S.C. 154(b) by 5 days.

(21) Appl. No.: 18/052,605

(22) Filed: Nov. 4, 2022

(65) Prior Publication Data

US 2024/0148094 A1 May 9, 2024

(51) Int. Cl.

| | |
|---|---|
| *A42B 3/04* | (2006.01) |
| *F21S 4/26* | (2016.01) |
| *F21V 3/04* | (2018.01) |
| *F21V 21/084* | (2006.01) |
| *F21V 23/04* | (2006.01) |
| *F21V 23/06* | (2006.01) |
| *F21V 31/00* | (2006.01) |
| *F21W 111/10* | (2006.01) |
| *F21Y 103/10* | (2016.01) |

(52) U.S. Cl.
CPC .............. *A42B 3/0453* (2013.01); *F21S 4/26* (2016.01); *F21V 3/049* (2013.01); *F21V 21/084* (2013.01); *F21V 23/0407* (2013.01); *F21V 23/06* (2013.01); *F21V 31/00* (2013.01); *F21W 2111/10* (2013.01); *F21Y 2103/10* (2016.08)

(58) Field of Classification Search
CPC .......... A42B 3/0453; F21S 4/26; F21V 3/049; F21V 21/084; F21V 23/0407; F21V 23/06; F21V 31/00
See application file for complete search history.

(56) References Cited

PUBLICATIONS

Ou, CN201480092, Apr. 2009 (Year: 2009).*
Zhang et al., CN 111248569, Feb. 2020 (Year: 2020).*

* cited by examiner

*Primary Examiner* — Mary Ellen Bowman

(57) ABSTRACT

A warning signal device of a helmet, which includes: a helmet, having a shock absorbing pad disposed an upper portion defined therein; a light-pervious head housing, disposed on a surface of the helmet; a soft wiring light source structure electrically connected to plural light sources and disposed on the shock absorbing pad and corresponding to the light-pervious head housing; a waterproof sleeve disposed at an outer side of the soft wiring light source structure; a cathode dual-connector and an anode dual-connector respectively connected to two ends of the soft wiring light source structure; and a battery case and power switch disposed on the shock absorbing pad and including a battery case and a power switch electrically connected; the battery case and power switch is disposed with a selecting switch allowing a lighting, a light color, a lighting and flashing time of the light source to be selected.

7 Claims, 2 Drawing Sheets

WARNING SIGNAL DEVICE OF HELMET

BACKGROUND OF THE INVENTION

1. Field of the Invention

The present invention relates to a warning signal device, especially to a warning signal device of a helmet, in which a light source being able to emit a signal having lighting and a certain brightness and the signal is transmitted out through the helmet for increasing the attention drawing capability.

2. Description of Related Art

In the prior arts, the conventional helmets can be categorized into an opened type, a fully-covered type, a lifting type and a composite type. The structure of the helmet is formed as a cap member having a smooth surface, and the helmet is unable to be provided with any structure to emit a signal (for example a signal having lighting and a certain brightness), thus the attention drawing capability is not available and a function of preventing accidents cannot be provided in advance. The rider may only know wearing a helmet can reduce the damages after an accident happened, thus the conventional helmet does not have the required functions in actual needs. Accordingly, the practicability is very much limited, and the shortages existed in the prior art shall be improved by the skilled people in the art.

SUMMARY OF THE INVENTION

For solving the shortages existed in the prior art, one primary objective of the present invention is to provide a warning signal device of a helmet, in which a helmet is disposed with a light-pervious head housing, and a soft wiring light source structure having a light source is disposed and covered at a relative location, and the helmet is disposed with a battery case and power switch and a selecting switch, for solving the shortages existed in the prior art.

Another objective of the present invention is to provide a warning signal device of a helmet, in which with a soft wiring light source structure disposed in a helmet and through a battery case and power switch and a selecting switch, thus the light source is provided with effects of generating lighting, the variable colors of light and the flashing time for being emitted through a light-pervious head housing so as to provide an warning effect.

One another objective of the present invention is to provide a warning signal device of a helmet, which has advantages of effectively increasing the operating convenience and only increasing the functions, the efficiency, and the attention drawing capability and the safety.

The problem to be solved by the present invention is that: The structure of the helmet is formed as a cap member having a smooth surface, and the helmet is unable to be provided with any structure to emit a signal (for example a signal having lighting and a certain brightness), thus the attention drawing capability is not available and a function of preventing accidents cannot be provided in advance. The rider may only know wearing a helmet can reduce the damages after an accident happened, thus the conventional helmet does not have the required functions in actual needs. Accordingly, the practicability.

For achieving the aforesaid objectives, one technical solution provided by the present invention is to provide a warning signal device of a helmet, which includes:

a helmet, having a shock absorbing pad disposed an upper portion defined therein;

a light-pervious head housing, disposed on a surface of the helmet and formed with at least one opening/closing port;

a soft wiring light source structure, electrically connected to a plurality of light sources, wherein the soft wiring light source structure is disposed on the shock absorbing pad of the helmet and corresponding to the light-pervious head housing;

a waterproof sleeve, formed in a transparent status and disposed at an outer side of the soft wiring light source structure;

a cathode dual-connector, connected to one end of the soft wiring light source structure; an anode dual-connector, connected to another end of the soft wiring light source structure; and a battery case and power switch, disposed on the shock absorbing pad and including a battery case and a power switch electrically connected and corresponding to the opening/closing port of the light-pervious head housing, wherein the power switch is disposed on an electric circuit board, the battery case and power switch is electrically connected to the cathode dual-connector and the anode dual-connector;

wherein, a signal having a certain brightness is emitted by the light source of the soft wiring light source structure through the light-pervious head housing of the helmet.

Preferably, according to the present invention, the battery case and power switch is disposed with a selecting switch allowing a lighting, a light color, a lighting and flashing time of the light source of the soft wiring light source structure to be selected, and the selecting switch is electrically connected to the electric circuit board.

Preferably, according to the present invention, a lower end where the shock absorbing pad being disposed in the helmet is disposed with an internal buffering pad and two sides thereof are disposed with an ear protecting pad.

Preferably, according to the present invention, two sides defined at a lower end of the helmet are disposed with a retaining fastening strip device.

Preferably, according to the present invention, the light-pervious head housing is formed with at least one pattern and/or text, and the pattern and/or text is able to be customized.

Advantages achieved by the present invention are as follows: the helmet is disposed with the light-pervious head housing, and the soft wiring light source structure having the light source is disposed and covered at a relative location; the helmet is disposed with the battery case and power switch and the selecting switch; as such, with the soft wiring light source structure disposed in the helmet and through the battery case and power switch and the selecting switch, the light source is provided with effects of generating lighting, the variable colors of light and the flashing time for being emitted through the light-pervious head housing so as to provide an warning effect; as such, the operating convenience is effectively increased and the functions, the efficiency, and the attention drawing capability and the safety can also be increased.

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 1:
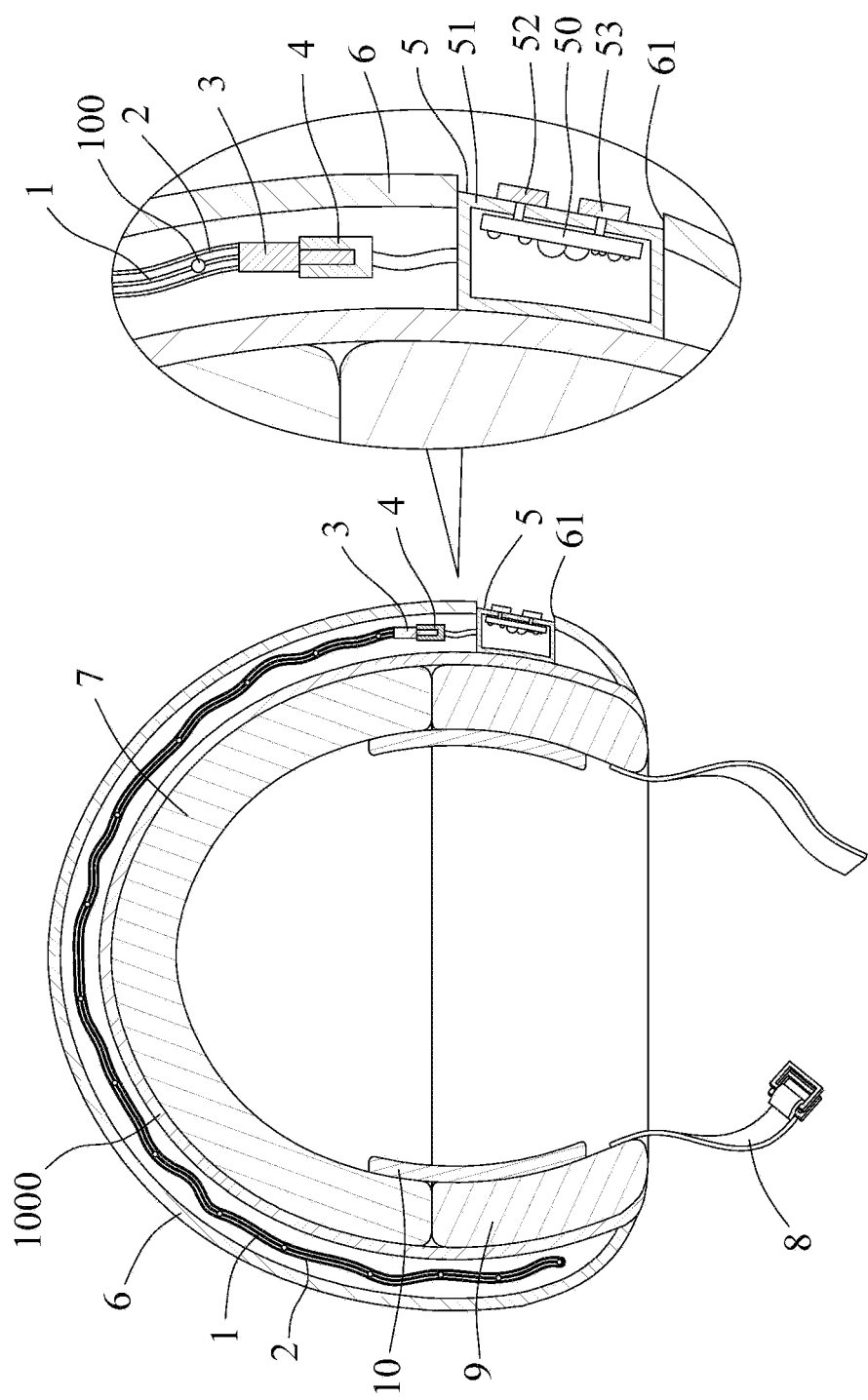
FIG. 1 is a cross sectional view showing the assembly according to the present invention.

Please refer to FIG. 1, which is a cross sectional view showing the assembly according to the present invention. According to one preferred embodiment, the present invention provides a warning signal device of a helmet, which includes a helmet 1000, a light-pervious head housing 6, a soft wiring light source structure 1, a waterproof sleeve 2, a cathode dual-connector 3, an anode dual-connector 4, a battery case and power switch 5.

Preferably, an upper portion defined in the helmet 1000 is disposed with a shock absorbing pad 7; the helmet 1000 of the present invention is applicable to all types of the helmets 1000; a lower end where the shock absorbing pad 7 being disposed in the helmet 1000 is disposed with an internal buffering pad 9 and two sides thereof are disposed with an ear protecting pad 10; and two sides at a lower end of the helmet 1000 are disposed with a retaining fastening strip device 8.

Preferably, the light-pervious head housing 6 is disposed on a surface of the helmet 1000 and formed with at least one opening/closing port 61; the light-pervious head housing 6 is formed with at least one pattern and/or text; the pattern and/or text can be customized.

Preferably, the soft wiring light source structure 1 is electrically connected to a plurality of light sources 100; according to one embodiment of the present invention, the light source 100 includes, but not limits to, a light emitting diode (LED) or an incandescent light source; the soft wiring light source structure 1 is disposed on the shock absorbing pad 7 of the helmet 1000 and corresponding to the light-pervious head housing 6; the light source 100 of the soft wiring light source structure 1 is able to emit a signal, in other words the light source 100 can generate lighting and a certain brightness, the signal having the lighting and the certain brightness of the light source 100 can be adjusted through a selecting switch 53.

Preferably, the waterproof sleeve 2 is formed in a transparent status and disposed at an outer side of the soft wiring light source structure 1.

Preferably, the cathode dual-connector 3 is connected to one end of the soft wiring light source structure 1.

Preferably, the anode dual-connector 4 is connected to another end of the soft wiring light source structure 1.

Preferably, the battery case and power switch 5 is disposed on the shock absorbing pad 7 and includes a battery case 51 and a power switch 52 which are electrically connected and corresponding to the opening/closing port 61 of the light-pervious head housing 6; the power switch 52 is disposed on an electric circuit board 50, the battery case and power switch 5 is electrically connected to the cathode dual-connector 3 and the anode dual-connector 4; with the light source 100 of the soft wiring light source structure 1 and through the light-pervious head housing 6 of the helmet 1000, the brightness of the signal is able to be adjusted, in other words the battery case and power switch 5 is disposed with the above-mentioned selecting switch 53 allowing the lighting, the light color, the lighting and flashing time of the light source 100 of the soft wiring light source structure 1 to be selected. The selecting switch 53 is electrically connected to the electric circuit board 50; according to one embodiment of the present invention, the lighting, the light color, the lighting and the flashing time and the light emitting type and the type of the light source 100 may be altered according to operating needs.

Figure 2:
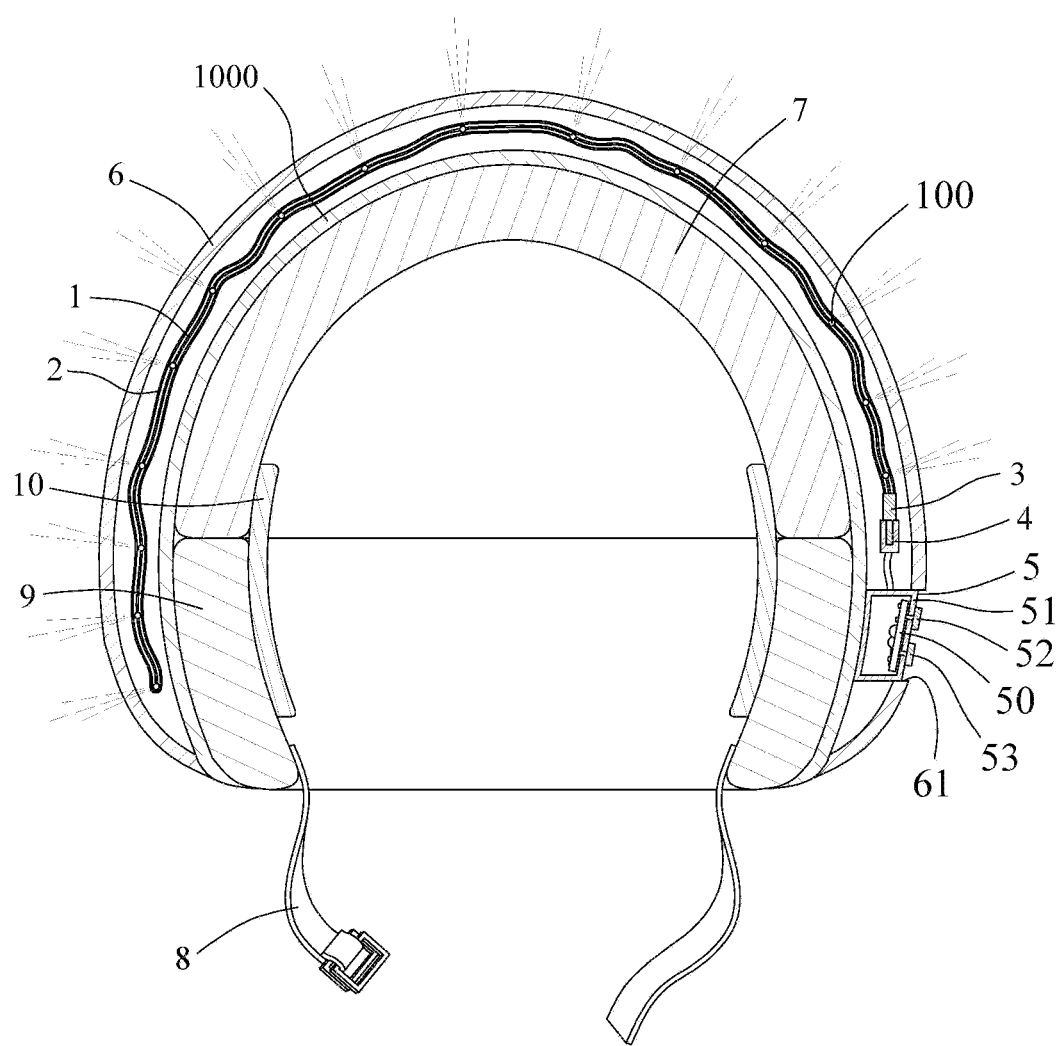
FIG. 2 is a schematic view showing the light source of the soft wiring light source structure emitting the signal having lighting and a certain brightness according to the present invention.

Please refer to FIG. 2 and according to the present invention, when the battery is placed in to actuate the battery case and power switch 5, the selecting switch 53 can be optionally operated to emit the signal, at this moment, the light source 100 of the soft wiring light source structure 1 is able to emit the signal having the certain brightness, so that an optical aesthetic visual effect is provided to increase the attention drawing capability for enhancing the traffic safety, and a helmet wearing device having a warning effect and capable of being used in a general or an emergent condition is provided; and the present invention is characterized in that the signal having the lighting and the certain brightness can be emitted, the signal is adjustable, and an warning effect with rapid flashing lighting in the emergent condition can be provided; and the warning lighting, the flashing time and the lighting with a special color can be freely adjusted when being required by a police or a certain operation personnel.

According to the present invention, the helmet 1000 is disposed with the light-pervious head housing 6, and the soft wiring light source structure 1 having the light source 100 is disposed and covered at a relative location; the helmet 1000 is disposed with the battery case and power switch 5 and the selecting switch 53; as such, with the soft wiring light source structure 1 disposed in the helmet 100 and through the battery case and power switch 5 and the selecting switch 53, the signal having the lighting and the certain brightness emitted by the light source 100 is adjustable, and an warning effect with rapid flashing lighting in the emergent condition can be provided; and the warning lighting, the flashing time and the lighting with a special color of the light source 100 can be freely adjusted when being required by the police or the certain operation personnel, thus the light source 100 is provided with effects of generating lighting, the variable colors of light and the flashing time for being emitted through the light-pervious head housing 6 so as to provide an warning effect; as such, the operating convenience is effectively increased and the functions, the efficiency, and the attention drawing capability and the safety (increasing the attention drawing capability and providing the warning effect) can also be increased. Accordingly, the present invention is novel, more practical in use and satisfies the requirements of the users.

Based on what have been disclosed above, while this present invention has been described by means of specific embodiments, numerous modifications and variations could be made thereto by those skilled in the art without departing from the scope and spirit of the present invention set forth in the claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A warning signal device of a helmet, including:
the helmet, having a shock absorbing pad disposed an upper portion defined therein;
a light-pervious head housing, disposed on a surface of the helmet and formed with at least one opening/closing port;
a soft wiring light source structure, electrically connected to a plurality of light sources, wherein the soft wiring light source structure is disposed on the shock absorbing pad of the helmet and corresponding to the light-pervious head housing;
a waterproof sleeve, formed in a transparent status and located around an outer side of the soft wiring light source structure;
a cathode dual-connector, connected to one end of the soft wiring light source structure;
an anode dual-connector, connected to another end of the soft wiring light source structure; and
a battery case and power switch, disposed on the shock absorbing pad and including a battery case and a power switch electrically connected and corresponding to the opening/closing port of the light-pervious head housing, wherein the power switch is disposed on an electric circuit board, the battery case and power switch is electrically connected to the cathode dual-connector and the anode dual-connector;
wherein, a signal having a certain brightness is emitted by the light source of the soft wiring light source structure through the light-pervious head housing of the helmet;
wherein the soft wiring light source structure and the waterproof sleeve are located between the light-pervious head housing and the shock absorbing pad, and the helmet is located between the soft wiring light source structure and the waterproof sleeve and the shock absorbing pad.

2. The warning signal device of the helmet as claimed in claim 1, wherein the battery case and power switch being disposed with a selecting switch allowing a lighting, a light color, a lighting and flashing time of the light source of the soft wiring light source structure to be selected, wherein the selecting switch is electrically connected to the electric circuit board.

3. The warning signal device of the helmet as claimed in claim 2, wherein a lower end where the shock absorbing pad being disposed in the helmet being disposed with an internal buffering pad and two sides thereof being disposed with an ear protecting pad, the ear protecting pad is located adjacent to and engaging the shock absorbing pad and the internal buffering pad.

4. The warning signal device of the helmet as claimed in claim 3, wherein two sides of the internal buffering pad defined at a lower end of the helmet being disposed with a retaining fastening strip device.

5. The warning signal device of the helmet according to any claim from 1 to 4, wherein as claimed in claim 1, wherein the light-pervious head housing being formed with at least one pattern, wherein the pattern is able to be customized.

6. The warning signal device of the helmet according to any claim from 1 to 4, wherein the light-pervious head housing being formed with at least one text, wherein the text is able to be customized.

7. The warning signal device of the helmet according to any claim from 1 to 4, wherein the light-pervious head housing being formed with at least one pattern and text, and the pattern and text are able to be customized.

* * * * *